US007973784B2

(12) United States Patent
Yamazaki

(10) Patent No.: US 7,973,784 B2
(45) Date of Patent: Jul. 5, 2011

(54) ELECTRO-OPTICAL DEVICE, DRIVE CIRCUIT, AND ELECTRONIC APPARATUS

(75) Inventor: Katsunori Yamazaki, Matsumoto (JP)

(73) Assignee: Sony Corporation, Tokyo (JP)

( * ) Notice: Subject to any disclaimer, the term of this patent is extended or adjusted under 35 U.S.C. 154(b) by 979 days.

(21) Appl. No.: 11/882,830

(22) Filed: Aug. 6, 2007

(65) Prior Publication Data

US 2008/0094388 A1 Apr. 24, 2008

(30) Foreign Application Priority Data

Oct. 18, 2006 (JP) ................................ 2006-283467

(51) Int. Cl.
*G06F 3/038* (2006.01)
*G09G 5/00* (2006.01)
*G02F 1/133* (2006.01)

(52) U.S. Cl. ........... 345/212; 345/211; 345/213; 349/34

(58) Field of Classification Search .......... 345/211–213, 345/94, 96; 349/33–34, 37–38
See application file for complete search history.

(56) References Cited

U.S. PATENT DOCUMENTS 5,831,605 A 11/1998 Yasui et al.
2005/0088392 A1* 4/2005 Kim et al. ........................ 345/94
2006/0208985 A1* 9/2006 Hwang et al. .................... 345/92
2007/0024560 A1* 2/2007 Kim et al. ........................ 345/94

FOREIGN PATENT DOCUMENTS

JP A-09-218388 8/1997
JP A 2005-300948 10/2005

* cited by examiner

*Primary Examiner* — Sumati Lefkowitz
*Assistant Examiner* — Jonathan Horner
(74) *Attorney, Agent, or Firm* — K&L Gates LLP

(57) ABSTRACT

A drive circuit of an electro-optical device includes: plural rows of scanning lines; plural columns of data lines; a plurality of common electrodes; pixel switching elements, pixel capacitors; and pixels. Here, the drive circuit includes a scanning line drive circuit; and first transistors corresponding to the plurality of common electrodes. Each of the first transistors includes: a common electrode drive circuit for connecting the common electrode to a power supply line, to which a predetermined voltage is applied, when the scanning line is selected, a common signal output circuit having a voltage for allowing a detection voltage of the common electrode corresponding to a scanning line to become a reference voltage when the scanning line is selected, and a data line drive circuit having a voltage according to the gray scale level of the pixel to the pixel corresponding to the selected scanning line via the data line.

9 Claims, 12 Drawing Sheets

ELECTRO-OPTICAL DEVICE, DRIVE CIRCUIT, AND ELECTRONIC APPARATUS

BACKGROUND

1. Technical Field

The present invention relates to a technology for suppressing display unevenness in an electro-optical device such as a liquid crystal device and preventing a frame region from having to be increased in size.

2. Related Art

In an electro-optical device such as a liquid crystal device, there is a technology in which pixel capacitors (liquid crystal capacitors) are provided in correspondence with intersections of scanning lines and data lines, but common electrodes are individuated for each scanning line (for each row) in order to suppress the voltage amplitudes of the data lines when the pixel capacitors are AC-driven, and, when a scanning line is selected, the common electrode corresponding to the selected scanning line is connected to a power supply line through a transistor according to a writing polarity (JP-A-2005-300948).

However, in this technology, if the ON resistance of the transistor for connecting the common electrode to the power supply line is large, display unevenness is caused. If the ON resistance of the transistor is reduced, the size of the transistor is increased and the area of the device substrate which does not contribute to the display is also increased.

SUMMARY

An advantage of some aspects of the invention is that it provides an electro-optical device, a drive circuit, and an electronic apparatus, which are capable of suppressing the occurrence of display unevenness and preventing the sizes of transistors for connecting common electrodes to a power supply line from having to be increased, in a configuration in which the common electrodes are individually driven.

According to an aspect of the invention, there is provided a drive circuit of an electro-optical device including: plural rows of scanning lines; plural columns of data lines; a plurality of common electrodes provided in correspondence with the plural rows of scanning lines; pixel switching elements provided in correspondence with intersections of the plural rows of scanning lines and the plural columns of data lines, each of which has one end connected to the data line corresponding thereto and is put into a conductive state when a scanning line corresponding thereto is selected, pixel capacitors, each of which has one end connected to the other end of the pixel switching element corresponding thereto and the other end of which is connected to the common electrode corresponding thereto; and pixels each having a gray scale level according to a hold voltage of the pixel capacitor corresponding thereto, wherein the drive circuit includes a scanning line drive circuit for sequentially selecting one of the scanning lines in a predetermined order; and first transistors corresponding to the plurality of common electrodes, wherein each of the first transistors corresponding to the common electrodes includes: a common electrode drive circuit for connecting the common electrode to a power supply line, to which a predetermined voltage is applied, when the scanning line corresponding to the common electrode is selected, a common signal output circuit for supplying a common signal having a voltage for allowing a detection voltage of the common electrode corresponding to a scanning line to become a reference voltage when the scanning line is selected, and a data line drive circuit for supplying a data signal having a voltage according to the gray scale level of the pixel to the pixel corresponding to the selected scanning line via the data line.

In the invention, the common signal output circuit may buffer the reference voltage in a first period when a period for selecting the scanning line starts, and output the common signal for performing feedback control such that the voltage of the common electrode becomes the reference voltage, in a second period when a period for selecting the scanning line is finished.

In the invention, the common signal output circuit may set any one of a low voltage and a high voltage to a common electrode provided in a scanning line of an odd-numbered row and set the other of the low voltage and the high voltage to a common electrode provided in a scanning line of an even-numbered row, as the reference voltage. In this configuration, the common signal output circuit may include a first common signal output circuit provided in correspondence with the odd-numbered row; a second common signal output circuit provided in correspondence with the even-numbered row, and the first common signal output circuit may detect the voltage of the common electrode provided in correspondence with the scanning line and supply a first power supply line with a first common signal for controlling the detected voltage to become any one of the low voltage and the high voltage when the scanning line of the odd-numbered line is selected, the second common signal output circuit may detect the voltage of the common electrode provided in correspondence with the scanning line and supply a second power supply line with a second common signal for controlling the detected voltage to become the other of the low voltage and the high voltage when the scanning line of the even-numbered line is selected, and the common electrode drive circuit may connect the common electrode corresponding to the selected scanning of the odd-numbered row to the first power supply line if the selected scanning line is that of the odd-numbered row and connect the common electrode corresponding to the selected scanning line of the even-numbered row to the second power supply line when the selected scanning line is that of the even-numbered row. The common signal output circuit may have a switch circuit for selecting any one of the low voltage and the high voltage, and the switch circuit may select any one of the low voltage and the high voltage when the scanning line of the odd-numbered row is selected, select the other of the low voltage and the high voltage when the scanning line of the even-numbered row is selected, and supply the selected voltage as the reference voltage of the common signal output circuit.

In the invention, each of the common electrode drive circuits may include a second transistor in correspondence with the common electrode corresponding thereto, together with the first transistor, each of the first transistors corresponding to the common electrodes may have a gate electrode connected to the scanning line corresponding to the common electrode, a source electrode connected to the power supply line, and a drain electrode connected to the common electrode, each of the second transistors corresponding to a common electrode may have a gate electrode connected to the scanning line corresponding to the common electrode, a source electrode connected to the common electrode, and a drain electrode connected to a detection line, and the common signal output circuit may output the common signal to the power supply line such that the voltage of the detection line becomes the reference voltage.

In the invention, the common electrode drive circuit may include auxiliary capacitors in correspondence with the common electrodes, together with the first transistors, each of the first transistors corresponding to the common electrodes may have a gate electrode connected to the scanning line corresponding to the common electrode, a source electrode connected to the power supply line, and a drain electrode connected to the common electrode, one end of each of the auxiliary capacitors corresponding to the common electrode may be connected to the common electrode and the other end thereof is connected to a detection line, and the common signal output circuit may output the common signal to the power supply line such that the voltage of the detection line becomes the reference voltage.

The invention is applicable to an electro-optical device and an electronic apparatus including an electro-optical device as well as the drive circuit of the electro-optical device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the accompanying drawings.

First Embodiment

Figure 1:
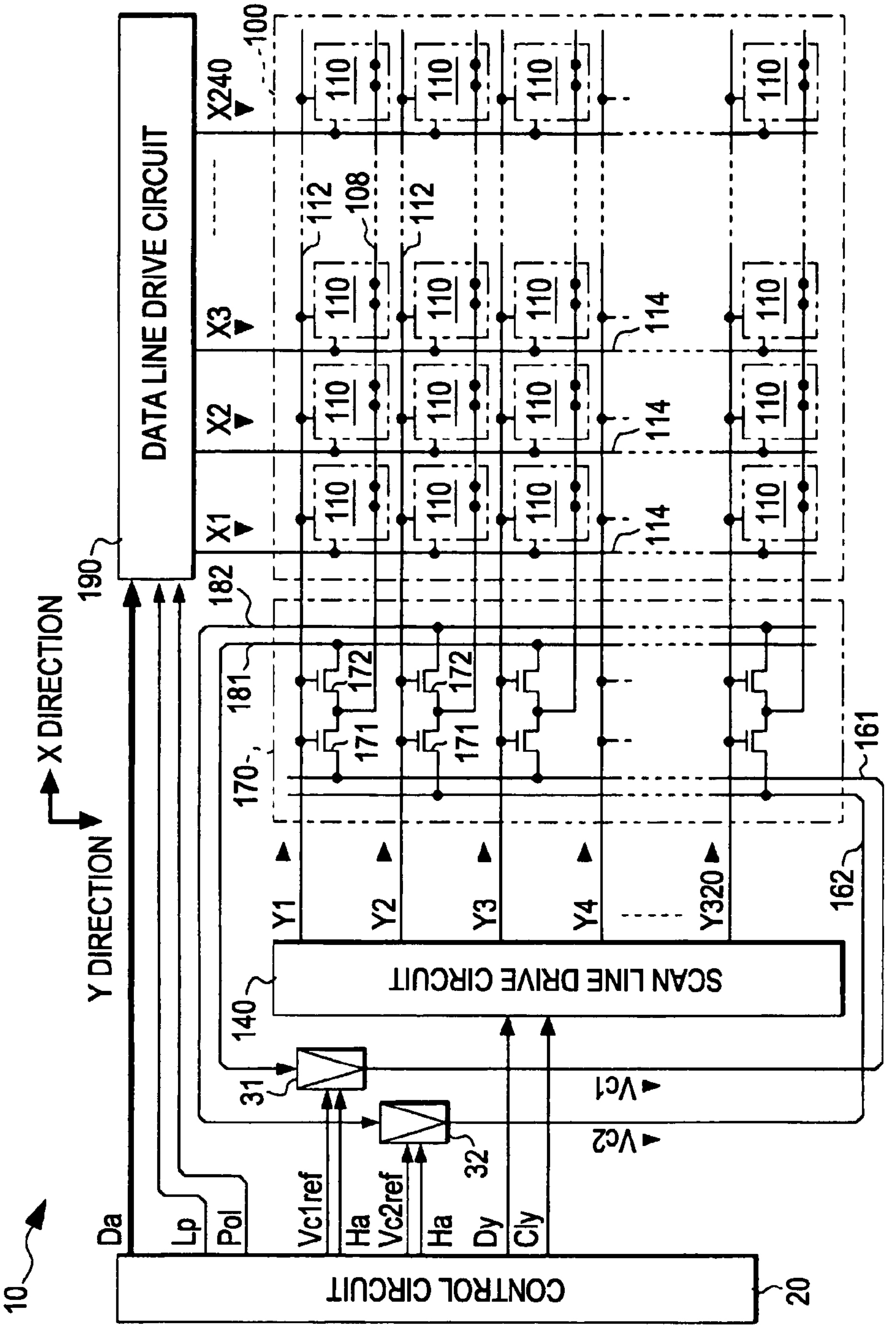
FIG. 1 is a view showing the configuration of an electro-optical device according to a first embodiment of the invention.

First, a first embodiment of the invention will be described. FIG. 1 is a block diagram showing the configuration of an electro-optical device according to the first embodiment of the invention.

As shown, the electro-optical device 10 has a display region 100 and a peripheral-circuit built-in panel in which a scanning line drive circuit 140, a common electrode drive circuit 170 and a data line drive circuit 190 are provided in the vicinity of the display region 100. A control circuit 20, a first common signal output circuit 31 and a second common signal output circuit 32 configure a group of circuit modules and are connected to the peripheral-circuit built-in panel, for example, by a flexible printed circuit (FPC) board.

The display region 100 is a region in which pixels 110 are arranged. In the present embodiment, the scanning lines 112 of the first to $320^{th}$ rows extend in a row (X) direction and 240 data lines 114 extend in a column (Y) direction. The pixels 110 are arranged in correspondence with intersections of the scanning lines 112 of the first to $320^{th}$ rows and the data lines 114 of the first to $240^{th}$ columns. Accordingly, in the present embodiment, the pixels 110 are arranged in a 320×240 matrix in the display region 100, but the invention is not limited to this arrangement.

Common electrodes 108 extend in the x direction in correspondence with the scanning lines 112 of the first to $320^{th}$ rows. Accordingly, in the present embodiment, the common electrodes 108 are provided in correspondence with the scanning lines of the first to $320^{th}$ rows.

Figure 2:
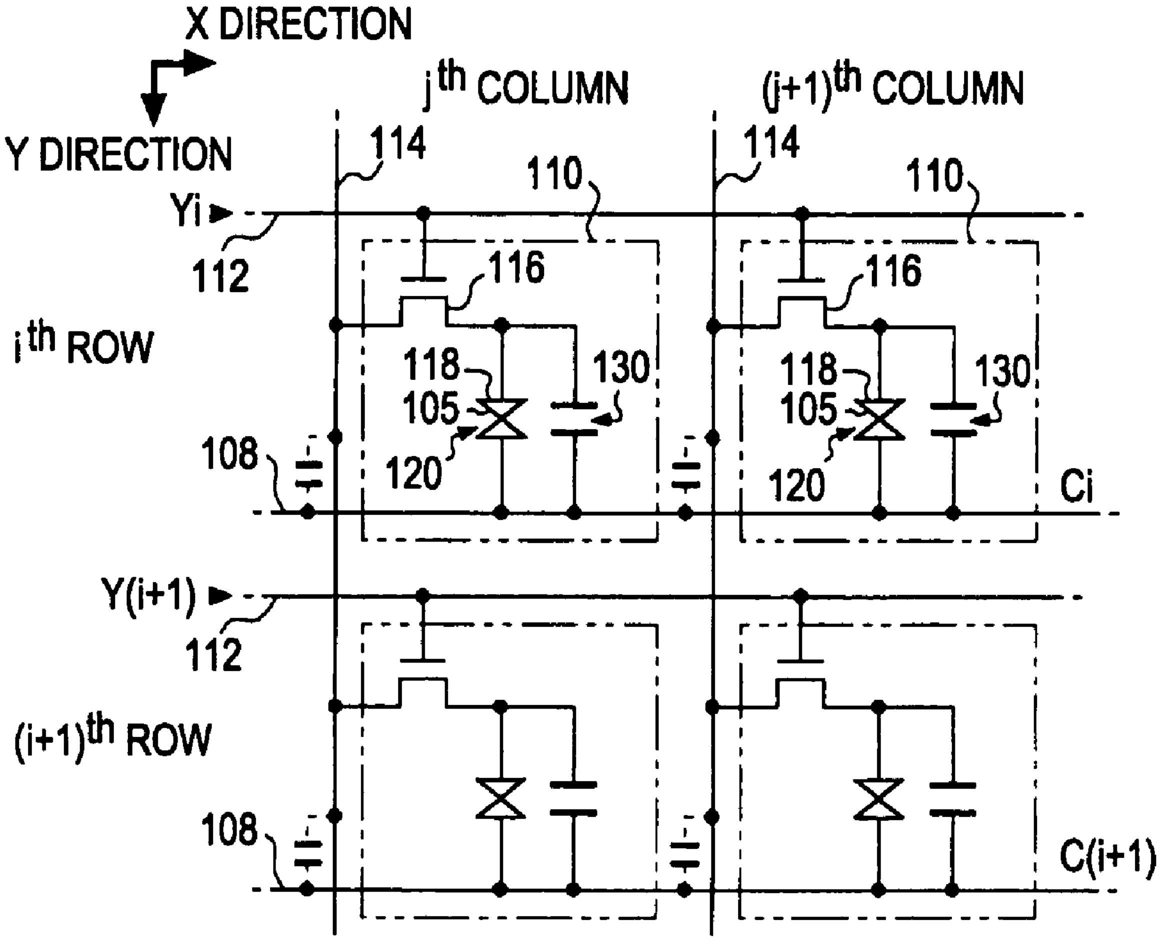
FIG. 2 is a view showing the configuration of a pixel in the electro-optical device.

Here, the detailed configuration of the pixels 110 will be described. FIG. 2 is a view showing the configuration of the pixel 110, wherein a total of four pixels arranged in a two-by-two matrix corresponding to the intersections of an $i^{th}$ row and a $(i+1)^{th}$ row adjacent thereto in a lower direction and a $j^{th}$ column and a $(j+1)^{th}$ column adjacent thereto in a right direction are shown.

Here, i and (i+1) indicate the rows in which the pixels 110 are arranged and is an integer ranging from 1 to 320 and j and (j+1) indicate the columns in which the pixels 110 are arranged and is an integer ranging from 1 to 230.

As shown in FIG. 2, each of the pixels 110 includes an n-channel-type thin-film transistor (hereinafter, abbreviated to "TFT") 116 functioning as a pixel switching element, a pixel capacitor (liquid crystal capacitor) 120, and a storage capacitor 130. Since the pixels 110 have the same configuration, a pixel located at the $i^{th}$ row and the j column is representatively described. In the pixel 110 located at the $i^{th}$ row and the $j^{th}$ column, the gate electrode of the TFT 116 is connected to the scanning line 112 of the $i^{th}$ row, the source electrode thereof is connected to the data line 114 of the $j^{th}$ column, and the drain electrode thereof is connected to one end of the pixel capacitor 120 and one end of the storage capacitor 130. The other end of the pixel capacitor 120 and the other end of the storage capacitor are connected to the common electrode 108.

In FIG. 2, Yi and Y(i+1) respectively indicate scan signals supplied to the scanning lines 112 of the $i^{th}$ and $(i+1)^{th}$ rows and Ci and C(i+1) respectively indicate the voltages of the common electrodes 108 of the $i^{th}$ and $(i+1)^{th}$ rows. The optical characteristics of the pixel capacitor 120 will be described later.

Returning to FIG. 1, the control circuit 20 outputs a variety of control signals to control the units of the electro-optical device 10, supplies a first reference signal Vc1ref and a period specifying signal Ha to the first common signal output circuit 31, and supplies a second reference signal Vc2ref and the period specifying signal Ha to the second common signal output circuit 32.

As described above, the peripheral circuits including the scanning line drive circuit 140, the common electrode drive circuit 170, and the data line drive circuit 190 are provided in the vicinity of the display region 100. Among them, the scanning line drive circuit 140 respectively supplies scan signals Y1, Y2, Y3, . . . , and Y320 to the scanning lines 112 of the first, second, third, . . . , and $320^{th}$ rows over a one frame period according to the control of the control circuit 20. In more detail, the scanning line drive circuit 140 selects the scanning lines 112 in the order of the first, the second, the third, . . . , and the 320$^{th}$ columns from the top of FIG. 1, sets a H level corresponding to a voltage Vdd to the scan signal of the selected scanning line, and sets an L level corresponding to a non-selection voltage (ground Gnd) to the scan signals of the other scanning lines.

Figure 5:
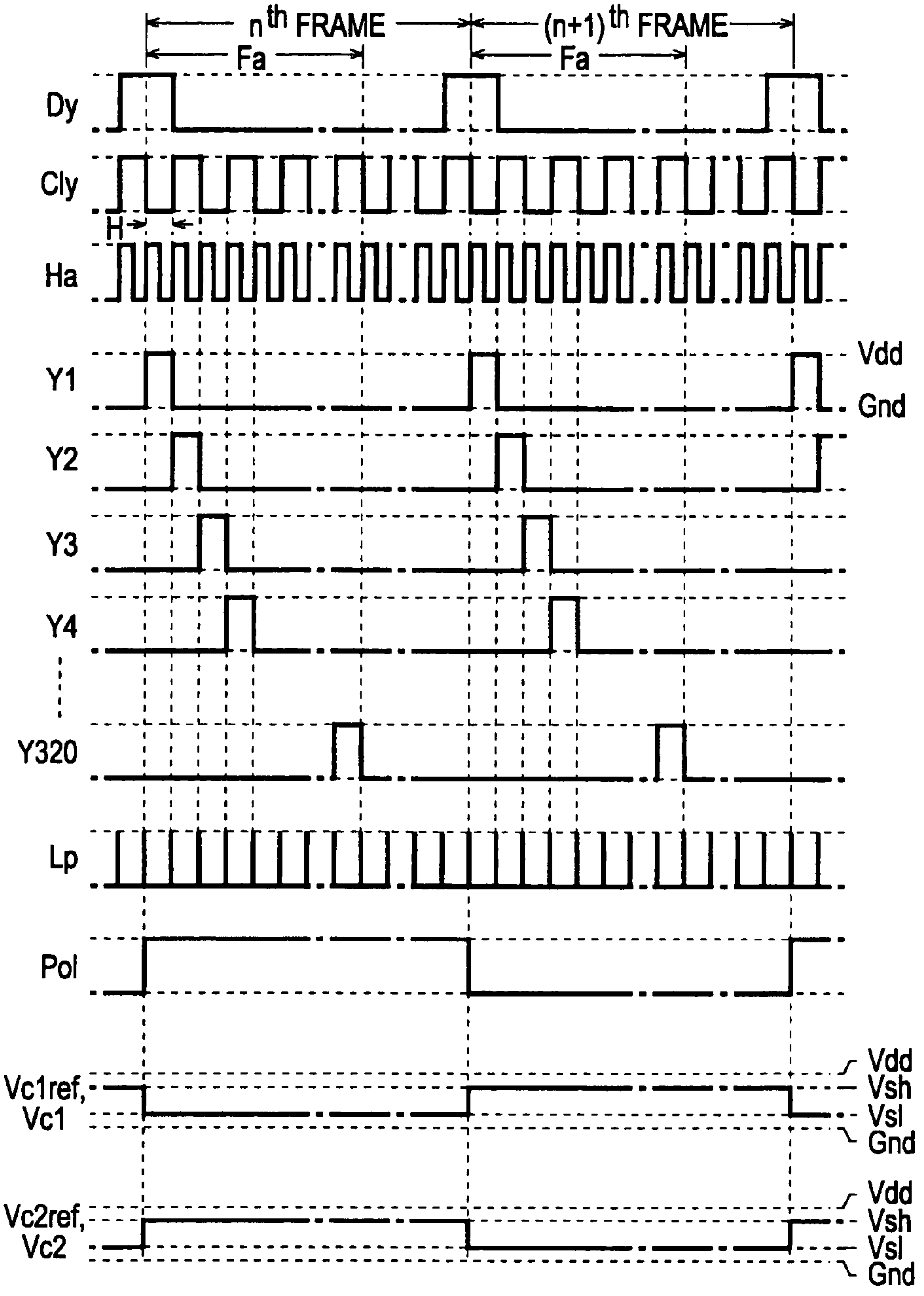
FIG. 5 is a view explaining the operation of the electro-optical device.

As shown in FIG. 5, the scanning line drive circuit 140 sets the H level in the order of the scanning lines Y1, Y2, Y3, Y4, . . . , and Y320 by sequentially shifting a start pulse Dy supplied from the control signal 20 according to a clock signal Cly.

In the present embodiment, in one frame period, as shown in FIG. 5, a return period is included, in addition to a valid scan period Fa from a time point when the scan signal Y1 becomes of the H level to a time point when the scanning line Y320 becomes of the L level. A period for selecting the scanning line 112 of the first row is a horizontal scan period H.

In the present embodiment, the common electrode drive circuit 170 includes sets of n-channel-type TFTs 171 and 172 provided in correspondence with the common electrodes 108 of the first to 320$^{th}$ rows. Here, if i indicates odd numbers (1, 3, 5, . . . , and 319), in the TFTs 171 (first transistor) in the odd-numbered i$^{th}$ rows, the gate electrode thereof is connected to the scanning line 112 of the i$^{th}$ row, the source electrode thereof is connected to a first power supply line 161, and the drain electrode is connected to the common electrode 108 of the i$^{th}$ row. In the TFT 172 (second transistor) of the same i$^{th}$ row, the gate electrode thereof is connected to the scanning line 112 of the same i$^{th}$ row, the source electrode thereof is connected to the common electrode 108 of the i$^{th}$ row, and the drain electrode is connected to a first detection line 181. Meanwhile, if (i+1) next to i indicates even numbers (2, 4, 6, . . . , and 320), the TFTs in the even-numbered (i+1)$^{th}$ rows are similar to the TFTs 171 and 172 in the odd-numbered i$^{th}$ rows except that the source electrode of the TFT 171 is connected to a second power supply line and the drain electrode of the TFT 172 is connected to a second detection line 182.

The data line drive circuit 190 supplies a voltage of the gray scale level of the pixel 110 located at the scanning line 112 selected by the scanning line drive circuit 140, that is, a data signal having a voltage according to the polarity specified by a polarity specifying signal Pol, to the data line 114.

In more detail, the data line drive circuit 190 has storage regions (not shown) corresponding to the matrix having 320 rows and 240 columns, and each of the storage regions stores display data Da for specifying a gray scale value (brightness) of the pixel 110 corresponding thereto. Here, when any scanning line 112 is selected, the data line drive circuit 190 reads the display data Da of the pixel 110 located at the scanning line 112 from the storage region, converts the data into a voltage according to the gray scale level specified by the read display data, that is, a voltage according to the specified polarity, and supplied the voltage to the data line 114 as a data signal. The data line drive circuit 190 performs the supply operation for the first to 240$^{th}$ columns located at the selected scanning lines 112.

When the display contents of the display data Da stored in the storage region are changed, the modified display data Da is supplied and rewritten by the control circuit 20 together with an address.

The control circuit 20 supplies a latch pulse Lp to the data line drive circuit 190 at a timing when the logic level of the clock signal Cly transitions. As described above, since the scanning line drive circuit 140 outputs the scan signals Y1, Y2, Y3, Y4, . . . , and Y320 by sequentially shifting the start pulse Dy according to the clock signal ClY, a start timing of a period for selecting the scanning line becomes a timing where the logic level of the clock signal Cly transitions. Accordingly, the data line drive circuit 190 can recognize which row of scanning lines is selected by continuously counting the latch pulse Lp from the start of one frame period and recognize the start timing of the selection by the timing for supplying the latch pulse Lp.

In the present embodiment, if the polarity specifying signal Pol is the H level, positive polarity writing is specified with respect to the scanning lines of the odd-numbered rows and negative polarity writing is specified with respect to the scanning lines of the even-numbered rows. In contrast, if the polarity specifying signal Pol is the L level, negative polarity writing is specified with respect to the scanning lines of the odd-numbered rows and positive polarity writing is specified with respect to the scanning lines of the even-numbered rows. As shown in FIG. 5, the polarity specifying signal Pol is held at the same level in any frame (denoted by "n$^{th}$ frame") period. Accordingly, the present embodiment uses a row inversion (also called line inversion or scanning line inversion) method in which the writing polarity of the pixel is inverted for each row. The polarity specifying signal Pol is logically inverted for each frame period. The reason why the writing polarity is inverted is to prevent the liquid crystal from deteriorating by applying a DC component. In the writing polarity of the present embodiment, when the voltage according to the gray scale level is held with respect to the pixel capacitor 120, a case where the potential of the pixel electrode 118 is higher than that of the common electrode 108 is called a positive polarity and a case where the potential of the pixel electrode 118 is lower than that of the common electrode 108 is called a negative polarity. With respect to the voltage, if not specially described, the ground potential Gnd of the power supply corresponds to the L level of the logic level and a voltage of zero is used as a reference.

The first reference signal Vc1ref becomes a voltage Vs1 when the polarity specifying signal Pol is the H level and becomes a voltage Vsh when the polarity specifying signal Pol is the L level. In contrast, the second reference signal Vc2ref becomes the voltage Vsh when the polarity specifying signal Pol is the H level and becomes the voltage Vsl when the polarity specifying signal Pol is the L level.

Here, the voltages Vsl and Vsh have a relationship of (Gnd≦) Vsl<Vsh (≦Vdd) and thus the voltage Vsl is lower than the voltage Vsh.

Figure 3:
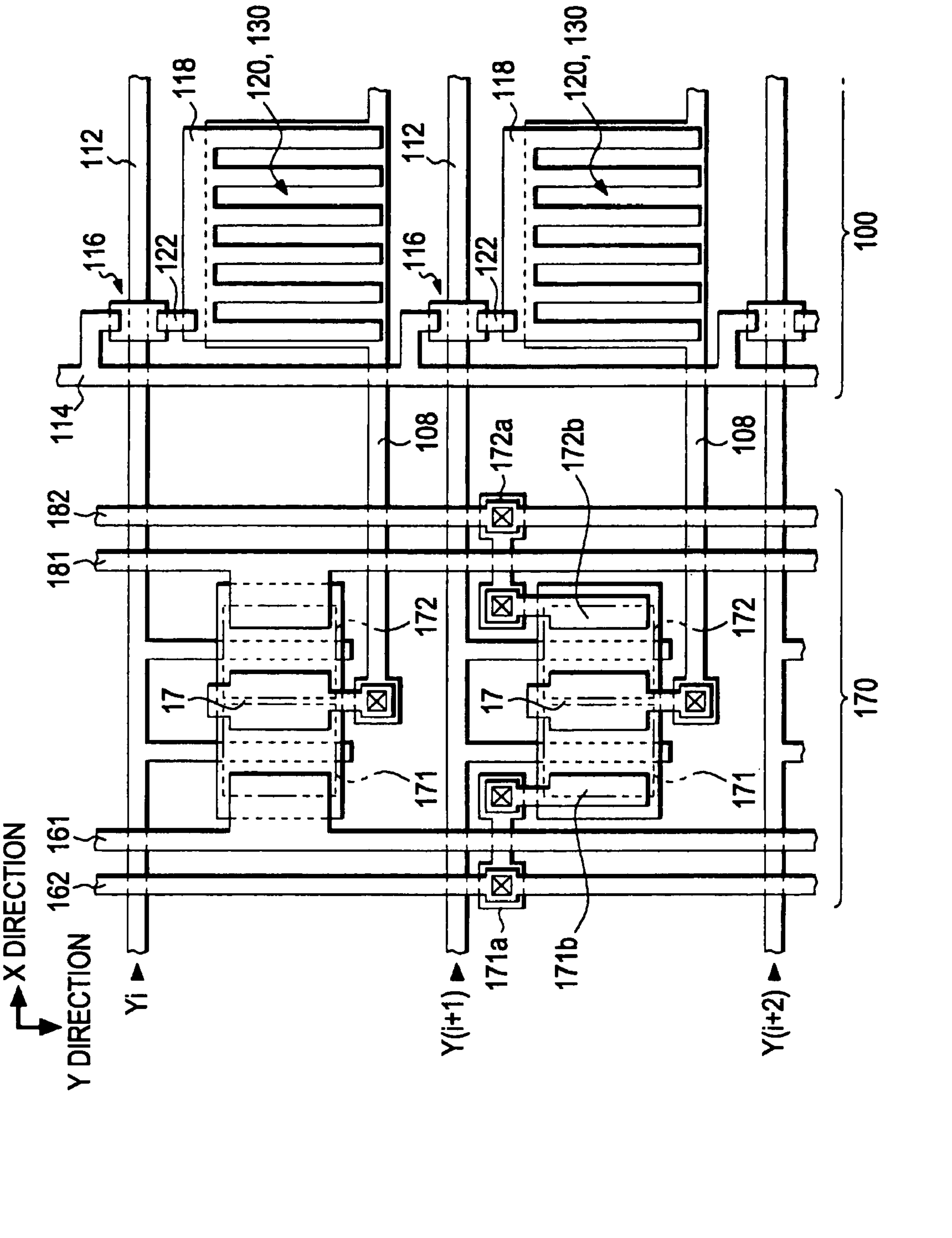
FIG. 3 is a plan view showing the configuration of main portions on a device substrate of the electro-optical device.

In the electro-optical device, the panel is configured by adhering a device substrate and a counter substrate with a predetermined gap therebetween and filling liquid crystal in the gap. On the device substrate, the scanning lines 112, data lines 114, the common electrodes 108, the pixel electrodes 118, and the TFTs 116, 171, and 172 are formed, and the device substrate is adhered to the counter substrate such that an electrode forming surface thereof faces the counter substrate. FIG. 3 is a plan view showing the vicinity of the boundary between the display region 100 and the common electrode drive circuit 170.

As can be seen from FIG. 3, the display region 100 has a fringe field switching (FFS) mode which is a modification of an in-plane switching (IPS) mode, in which an electric field is applied to the liquid crystal in a direction parallel to the substrate surface. In the present embodiment, the TFTs 116, 171 and 172 is of an amorphous silicon type and a bottom gate type in which the gate electrode is located below a semiconductor layer (at the back side of the sheet).

In more detail, the scanning lines 112, the common electrodes 108, and interconnections are formed by patterning a gate electrode layer which is a first conductive layer, a gate insulating film (not shown) is formed thereon, and semiconductor layers of the TFTs are formed in an island shape. On the semiconductor layers, the comb-like pixel electrodes 118 are formed by patterning an indium tin oxide (ITO) layer which is a second conductive layer, with a protective layer interposed therebetween, and the source electrodes or the drain electrodes of the TFTs, the data lines 114, the first power supply line 161, the second power supply line 162, the first detection line 181, the second detection line 182 and a variety of connection electrodes are formed by patterning a metal layer which is a third conductive layer, such as aluminum.

In the present embodiment, the storage capacitor 130 is a capacitance component which is configured by a laminated structure obtained by inserting an insulating layer between the pixel electrode 118 and the common electrode 108. Since the liquid crystal is filled into the gap between the device substrate and the counter substrate, a capacitance component is configured by a structure obtained by inserting the liquid crystal, which is a dielectric material, between the pixel electrode 118 and the common electrode 108. In the present embodiment, the capacitance component which occurs due to the interposed liquid crystal is the pixel capacitor 120.

In such a configuration, an electric field according to a hold voltage of a parallel capacitor between the pixel capacitor 120 and the storage capacitor 130 is generated along the surface of the device substrate in the X direction perpendicular to the teeth f the pixel electrode 118 to change the alignment state of the liquid crystal. Accordingly, the intensity of light passing through a polarizer (not shown) becomes a value according to an effective value of the hold voltage.

Although the FFS mode is used in the present embodiment, the IPS mode may be used and another mode may be used if the electric equivalent circuit thereof is equal to the circuit shown in FIG. 2.

Here, since the hold voltage of the parallel capacitor is a voltage difference between the pixel electrode 118 and the common electrode 108, in order to set the pixel located at the $i^{th}$ row and the $j^{th}$ column to become a desired gray scale level, the voltage Vdd of the H level is applied to the scanning line 112 of the $i^{th}$ row to turn on the TFT 116 and the data signal Xj which allows the voltage difference to become the voltage according to the gray scale level of the pixel is supplied to the pixel electrode 118 via the TFT 116 turned on at the $i^{th}$ row and the $j^{th}$ column and the data line 114 of the $j^{th}$ column.

For convenience of description, the present embodiment relates to a normally white mode in which white display in which light transmissivity has a maximum value if a voltage effective value is close to zero is performed, the intensity of the transmitted light is reduced as the voltage effective value increases, and finally black display in which the transmissivity has a minimum value is performed.

Meanwhile, the scanning line 112 of each row extends in the X direction in the display region 100, as described above. Here, the scanning line 112 of the $i^{th}$ row has two portions branched in the Y (lower) direction in the common electrode drive circuit 170, of which one portion becomes the gate electrode of the TFT 171 and the other portion becomes the gate electrode of the TFT 172.

Since a connection electrode 17 which functions as the drain electrode of the TFT 171 and the source electrode of the TFT 172 is obtained by patterning the third conductive layer and an insulating film is interposed between the connection electrode 17 and the common electrode 108 obtained by patterning the gate electrode layer, both the electrodes are connected by a contact hole (denoted by x in the drawing) passing through the insulating layer. A connection electrode 122 is obtained by patterning the third conductive layer and is used to connect the pixel electrode 118 to the drain electrode of the TFT 116.

Meanwhile, interconnections 171*a* and 172*a* are obtained by patterning the gate electrode layer. The interconnection 171*a* is used to connect the source electrode 171*b* of the TFT 171 corresponding to the even-numbered row to the second power supply line 162 crossing under the first power supply line 161 and the interconnection 172*a* is used to connect the drain electrode 172*b* of the TFT 172 corresponding to the even-numbered row to the second detection line 182 crossing under the first detection line 181.

Since the common electrode 108 of each row crosses the data lines 114 of the first to $240^{th}$ columns with the insulating layer interposed therebetween, the common electrode 108 and the data line 114 are capacitive-coupled via a parasitic capacitor as denoted by a dotted line of FIG. 2.

The configuration shown in FIG. 3 is only exemplary, and, regards the shape of the TFT, other structures, for example, a top gate type may be used in view of the arrangement of the gate electrode, and a polysilicon type may be used in view of a process. Instead of providing the device of the common electrode drive circuit 170 in the same process as the display region 100, an IC chip may be mounted on the device substrate.

When the IC chip is mounted on the device substrate, the scanning line drive circuit 140 and the common electrode drive circuit 170 may configure a semiconductor chip together with the data line drive circuit 190 and may configure different chips. Meanwhile, the control circuit 20 may be provided on the device substrate, together with the first common signal output circuit 31 and the second common signal output circuit 32.

In the present embodiment, a transmission type, a reflection type, or a semi-transmission semi-reflection type of a combination of the transmission type and the reflection type may be used. Accordingly, a reflection layer is not specifically described.

Subsequently, the first common signal output circuit 31 will be described with reference to FIG. 4. As shown, the first common signal output circuit 31 includes an operational amplifier 300, switches 311 and 312, a NOT circuit 315, and a resistor 316.

The output port of the operational amplifier 300 is connected to one end of the first power supply line 161 and the switch 311 and the first detection line 181 is connected to one end of the switch 312. The other ends of the switches 311 and 312 are each connected to a negative input port (−) of the operational amplifier 300. Meanwhile, the first reference signal Vc1ref from the control circuit is supplied to a positive input port (+) of the operational amplifier 300. The resistor 316 is interposed between the output port and the negative input port (−) of the operational amplifier 300.

The switches 311 and 312 are exclusively turned on/off according to the logic level of the period specifying signal Ha of the control signal 20. In more detail, the switch 311 is turned on if the period specifying signal Ha is the H level and the switch 312 is turned on if the signal obtained by inverting the logic level of the period specifying signal H by the not circuit 315 is the H level.

As shown in FIG. 5, since the period specifying signal Ha becomes of the H level in the first half period of the horizontal scan period H and becomes of the L level in the second half period, the switches 311 and 312 are turned on and off in the first half period of the horizontal scan period H and are turned off and on in the second half period thereof.

Accordingly, the first common signal output circuit 31 buffers the voltage of the first reference signal Vc1ref in the first half period of the horizontal scan period H and outputs the first common signal Vc1 for feedback-controlling the voltage of the first detection line 181 to become the voltage of the first reference signal Vc1ref.

Figure 4:
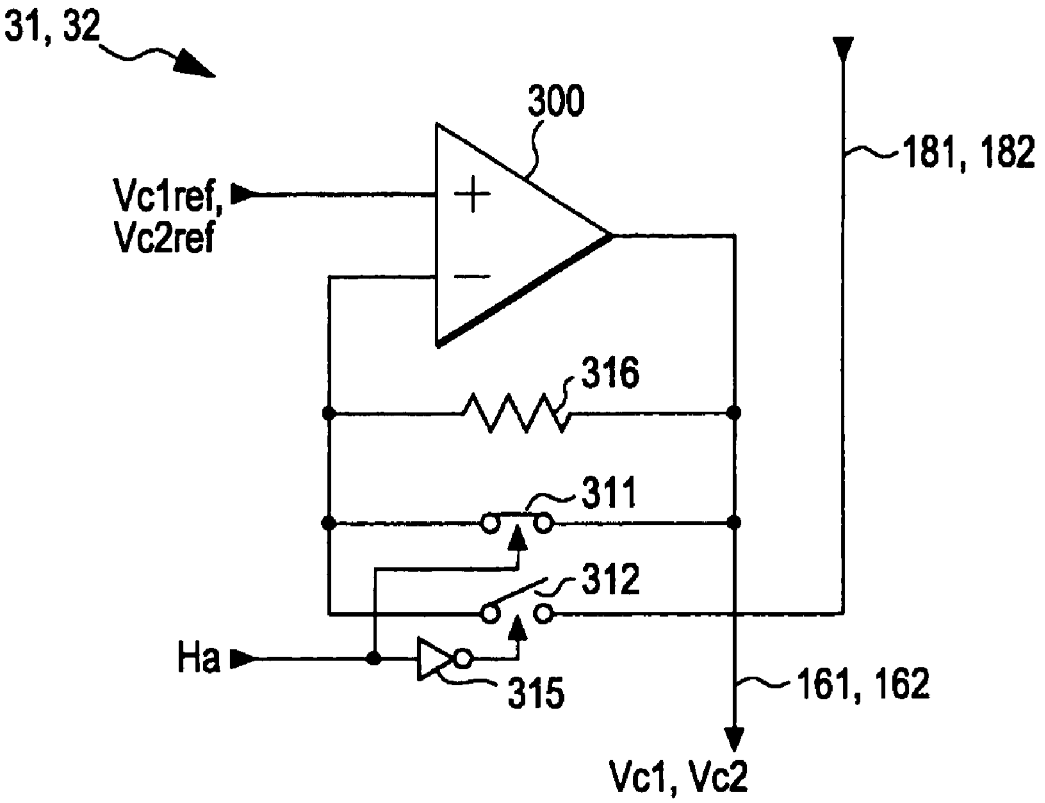
FIG. 4 is a view showing the configuration of a first common signal output circuit in the electro-optical device.

The second common signal output circuit 32 has the same configuration as the first common signal output circuit 31, as denoted by parenthesis of FIG. 4. Accordingly, the second common signal output circuit 32 buffers the voltage of the second reference signal Vc2ref in the first half period of the horizontal scan period H and outputs the second common signal Vc2 for feedback-controlling the voltage of the second detection line 182 to become the voltage of the second reference signal Vc2ref.

The resistor 316 defines a feedback amount, but, in view of precision, it is preferable that the resistance value of the resistor 316 is low in the buffering period. Accordingly, both the ends of the resistor 316 are short-circuited by the switch 311. Accordingly, if no problem occurs in view of precision, the switch 311 may be omitted.

The first common signal Vc1 output from the first common signal output circuit 31 may be equal to the voltage of the first reference signal Vc1ref as denoted by parenthesis of FIG. 5 and the second common signal Vc2 output from the second common signal output circuit 32 may be equal to the voltage of the second reference-signal Vc2ref.

Accordingly, the common electrodes 108 in the odd-numbered $i^{th}$ rows become the voltage of the first reference signal Vc1ref in a period when the scan signal Y1 is the H level and the common electrodes 108 in the even-numbered $(i+1)^{th}$ rows become the voltage of the second reference signal Vc2ref in a period when the scan signal Y(i+1) is the H level.

Next, the operation of the electro-optical device 10 according to the present embodiment will be described. As described above, in the present embodiment, as shown in FIG. 5, the control circuit 20 controls the polarity specifying signal Pol to the H level, controls the first reference signal Vc1ref to the voltage Vsl, and controls the second reference signal Vc2ref to the voltage Vsh, in the $n^{th}$ frame period.

In the $n^{th}$ frame, the scan signal Y1 first becomes of the H level by the scanning line drive circuit 140. When the latch pulse Lp is output at a timing when the scan signal Y1 becomes of the H level, for the first row, the data line drive circuit 190 reads the display data Da of the pixels of the first, second, third, . . . , and $240^{th}$ columns, converts it into data signals X1, X2, X3, . . . , and X240 each having a voltage higher than the voltage Vsl by the voltage specified by the display data Da, and supplies converted signals to the data lines 114 of the first, second, third, . . . , $240^{th}$ columns. Accordingly, for example, the voltage higher than the voltage Vsl by the voltage specified by the display data Da of the pixel 110 of first row and $j^{th}$ column is applied to the data line 114 of the $j^{th}$ column as the data signal Xj.

When the scan signal Y1 becomes of the H level, the TFTs 116 are turned on in the pixels of the first row and the first column to the first row and $240^{th}$ column and thus the data signals X1, X2, X3, . . . , and X240 are applied to the pixel electrodes 118.

In contrast, when the scan signal Y1 becomes of the H level, in the common electrode drive circuit 170, the TFTs 171 and 172 of the first row are turned on and the common electrode 108 of the first row is connected to the first power supply line 161. In the $n^{th}$ frame, since the first common signal Vc1 which is controlled to become the voltage Vsl of the first reference signal Vc1ref by the first common signal output circuit 31 is supplied to the first power supply line 161, the common electrode 108 of the first row becomes the voltage Vs1.

Accordingly, a voltage having the positive polarity according to the gray scale levels is applied to the parallel capacitors including the pixel capacitors 120 and the storage capacitors 130 of the first row and the first column to the first row and the $240^{th}$ column.

Next, the scan signal Y1 becomes of the L level and the scan signal Y2 becomes of the H level.

Here, when the scan signal Y1 becomes of the L level, the TFTs 116 of the pixels of the first row and the first column to the first row and the $240^{th}$ column are turned off and the TFTs 171 and 172 of the first row are turned off in the common electrode drive circuit 170.

Accordingly, in the pixels 110 of the first row and the first column to the first row and the $240^{th}$ column, since the pixel electrodes 118 are not electrically connected to any portion to become a high impedance state, but the common electrode 108 of the first row becomes the high impedance state, the voltage hold state is held without changing the voltage state written to the parallel capacitors including pixel capacitors 120 and the storage capacitors 130 of the first row and the first column to the first row and the $240^{th}$ column.

When the latch pulse Lp is output at a timing when the scan signal Y2 becomes of the H level, for the second row, the data line drive circuit 190 reads the display data Da of the pixels of the first, second, third, . . . , and $240^{th}$ columns, converts it into data signals X1, X2, X3, . . . , and X240 each having a voltage lower than the voltage Vsl by the voltage specified by the display data Da, and supplies converted signals to the data lines 114 of the first, second, third, $240^{th}$ columns. Accordingly, for example, the voltage higher than the voltage Vsl by the voltage specified by the display data Da of the pixel 110 of the second row and $j^{th}$ column is applied to the data line 114 of the $j^{th}$ column as the data signal Xj.

when the scan signal Y2 becomes of the H level, the TFTs 116 are turned on in the pixels of the second row and the first column to the first row and the $240^{th}$ column and thus the data signals X1, X2, X3, . . . , and X240 are applied to the pixel electrodes 118.

In contrast, when the scan signal Y2 becomes of the H level, in the common electrode drive circuit 170, the TFTs 171 and 172 of the second row are turned on and the common electrode 108 of the second row is connected to the second power supply line 162. In the $n^{th}$ frame, since the second common signal Vc2 which is controlled to become the voltage Vsh of the second reference signal Vc2ref by the second common signal output circuit 32 is supplied to the second power supply line 162, the common electrode 108 of the second row becomes the voltage Vsh.

Accordingly, a voltage having the negative polarity according to the gray scale levels is applied to the parallel capacitors including the pixel capacitors 120 and the storage capacitors 130 of the second row and the first column to the second row and the $240^{th}$ column.

Next, the scan signal Y2 becomes of the L level and the scan signal Y3 becomes of the H level.

Here, when the scan signal Y2 becomes of the L level, the TFTs 116 of the pixels of the second row and the first column to the second row and the $240^{th}$ column are turned off and the TFTs 171 and 172 of the second row are turned off in the common electrode drive circuit 170. Accordingly, in the pixels 110 of the second row and the first column to the second row and the $240^{th}$ column, since the pixel electrodes 118 become a high impedance state, but the common electrode 108 of the second row also becomes the high impedance state, the voltage hold state is held without changing the voltage state written to the parallel capacitors including pixel capacitors 120 and the storage capacitors 130 of the second row and the first column to the second row and the 240$^{th}$ column.

When the scan signal Y3 becomes of the H level, the voltage having the positive polarity according to the gray scale level is written to the parallel capacitor including the pixel capacitor 120 and storage capacitor 130 of the third row, and then, when the scan signal Y4 becomes of the H level, the voltage having the negative polarity according to the gray scale level is applied to the parallel capacitor including the pixel capacitor 120 and storage capacitor 130 of the third row.

The above-described operation is repeated up to the 320$^{th}$ row and thus the voltage having the positive polarity according to the gray scale level is written to the parallel capacitor including the pixel capacitors 120 in the odd-numbered rows and storage capacitors 130 and the voltage having the negative polarity according to the gray scale level is written to the parallel capacitor including the pixel capacitors 120 and storage capacitors 130 in the even-numbered rows. Since the voltage according to the gray scale level is written to the parallel capacitors of all the pixels, one (frame) image is displayed in the display region 100.

In the next (n+1)$^{th}$ frame, as shown in FIG. 5, the control circuit 20 controls the polarity specifying signal Pol to the L level, controls the first reference signal Vc1ref to the voltage Vsh, and controls the second reference signal Vc2ref to the voltage Vsl. Accordingly, in the (n+1)$^{th}$ frame, the voltage having the negative polarity according to the gray scale level is written to the parallel capacitor including the pixel capacitors 120 in the odd-numbered rows and storage capacitors 130 and the voltage having the positive polarity according to the gray scale level is written to the parallel capacitor including the pixel capacitors 120 and storage capacitors 130 in the even-numbered rows.

Figure 6:
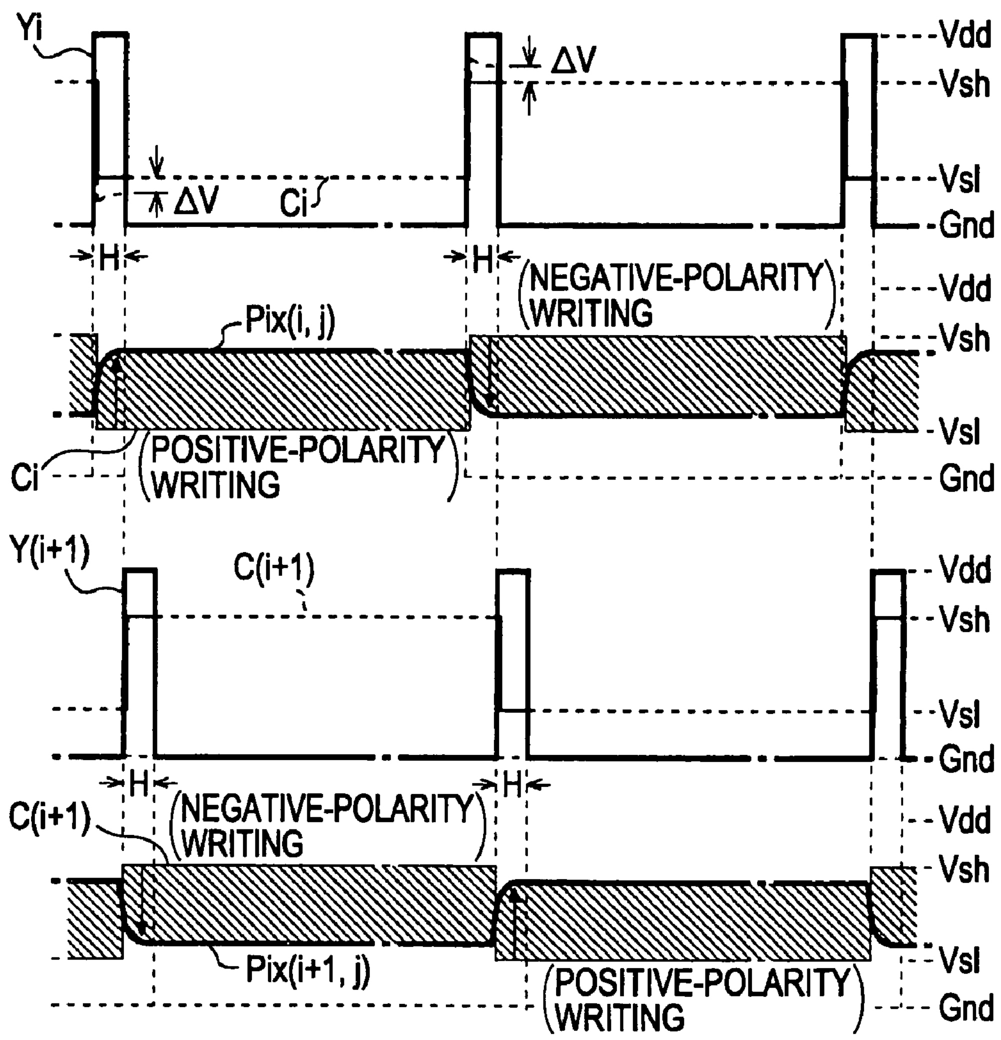
FIG. 6 is a view showing a voltage waveform of a pixel electrode in the electro-optical device.

Writing of the voltage will be described with reference to FIG. 6. FIG. 6 is a view showing a respective relationship between a voltage Pix(i, j) in the pixel electrode 118 of the i$^{th}$ row and the j$^{th}$ column and a voltage Pix(i+1, j) in the pixel electrode 118 of the (i+1)$^{th}$ row and the j$^{th}$ column and the scan signals Yi and Y(i+1). In FIG. 6, the vertical scale indicating the voltage more extends than the vertical scale of FIG. 5 for convenience sake.

As shown, when the scan signal Yi becomes of the H level in a frame specified by the positive polarity writing, the voltage Ci of the common electrodes 108 in the odd-numbered i$^{th}$ rows becomes the voltage Vsl of the first power supply line 161 by turning on the TFT 171 and the data signal Xj having the voltage (denoted by ↑ in the drawing) higher than the voltage Vsl by the voltage according to the gray scale level of the pixel of the i$^{th}$ row and the j$^{th}$ column is supplied to the data line 114 of the j$^{th}$ column. When the scan signal Yi becomes of the H level, the TFT 116 of the j$^{th}$ column is turned on and thus the pixel electrode 118 of the i$^{th}$ row and the j$^{th}$ column have the voltage of the data signal Xj. Thus, the voltage difference between the voltage Pix(i, j) of the pixel electrode 118 and the voltage Vsl of the common electrode 108, that is, the voltage according to the gray scale level, is written to the parallel capacitor including the pixel capacitor 120 and the storage capacitor 130 of the i$^{th}$ row and the j$^{th}$ column. In FIG. 6, the voltage difference corresponds to a hatched portion.

When the scan signal Yi becomes of the L level, the TFTs 116 and 171 are turned off, the pixel electrodes 118 of the i$^{th}$ row and the common electrodes 108 of the i$^{th}$ row become the high impedance state, and the voltage written to the i$^{th}$ row is held without change. In the drawing, the dotted line of the voltage Ci shows the high impedance state.

When one frame period elapses and the scan signal Yi becomes of the H level again, the negative polarity writing is specified and thus the voltage Ci of the common electrodes 108 in the odd-numbered i$^{th}$ row becomes the voltage Vsh and the data signal Xj having the voltage (denoted by ↓ in the drawing) lower than the voltage Vsh by the voltage according to the gray scale level of the pixel of the i$^{th}$ row and the j$^{th}$ column is supplied to the data line 114 of the j$^{th}$ column. Accordingly, the voltage according to the gray scale level is polarity-inverted and written to parallel capacitor including the pixel capacitor 120 and the storage capacitor 130 of the i$^{th}$ row and the j$^{th}$ column.

In a frame in which the positive polarity writing is specified with respect to the i$^{th}$ row, the negative polarity writing is specified with respect to the (i+1)$^{th}$ row, and, in a frame in which the negative polarity writing is specified with respect to the i$^{th}$ row, the positive polarity writing is specified with respect to the (i+1)$^{th}$ row. Accordingly, in the present embodiment, the writing polarity is inverted for each scanning line.

According to the embodiment, the common electrode 108 of the row, to which the positive polarity writing is specified, becomes the relatively low voltage Vsl and the voltage higher than the voltage Vsl by the voltage according to the gray scale level is supplied, when scanning line 112 of the row is selected. In contrast, the common electrode 108 of the row, to which the negative polarity writing is specified, becomes the relatively high voltage Vsh and the voltage lower than the voltage Vsh by the voltage according to the gray scale level is supplied, when the scanning line 112 of the row is selected.

Accordingly, since the voltage amplitude of the data signal is narrower compared with the case where the voltage of the common electrode 108 is constant, the pressure resistance required for the component of the data line drive circuit 190 is suppressed to be low, the configuration can be simplified, and the power which is vainly consumed by a variation in voltage can be suppressed.

However, in the present embodiment, in the i$^{th}$ row, when the scan signal Yi becomes of the H level, the TFTs 116 corresponding to the i$^{th}$ row are turned on and thus the voltage according to the data signal is charged in the pixel capacitor 120 and the storage capacitor 130. The charge current at this time flows in the TFT 171, which is turned on, via the common electrode 108 of the i$^{th}$ row. Here, if the ON resistance of the TFT 171 is high, noise may occur in the common electrode 108 of the i$^{th}$ row.

Meanwhile, since the common electrode 108 of each row crosses the data lines 114 of the first to 240$^{th}$ column via the gate insulating film as described above, a variation in voltage of the data lines 114, that is, the variation of the data signals X1 to X240, propagates to the common electrode 108 via the parasitic capacitor and thus noise occurs.

Noise occurs in the common electrode 108 of each row due to two factors. Since it is determined which of the two factors is more dominant, according to variety of conditions such as the configuration of the panel or the drive method, the factor cannot be accurately described, but it is apparent that noise is apt to occur in the common electrode 108 of each row.

As described above, the voltage Ci of the common electrode 108 of the i$^{th}$ row should become the voltage Vsl if the positive polarity writing is specified and become the voltage Vsh if the positive polarity writing is specified, at a timing when the selection of the scanning line of the same i$^{th}$ row is finished, that is, a timing when the scan signal Yi is changed from the H level to the L level. Here, as shown in FIG. 6, if the voltage Vsl is shifted by a voltage ΔV due to noise, the voltage shifted from the voltage according to the gray scale level by ΔV is held in the parallel capacitor including the pixel capacitor 120 and the storage capacitor 130, instead of the voltage according to the gray scale level, and the optical characteristic (transmissivity or reflectivity) according to the held voltage is obtained.

This phenomenon similarly occurs in the pixel of one row corresponding to the common electrode 108 of the $i^{th}$ row as well as the $i^{th}$ row and the $j^{th}$ column, the horizontal display unevenness is viewed.

The charge current due to the writing of the data signal between the two factors is determined by the display contents of the pixels of the $i^{th}$ row and the variation in voltage of the data lines of the first to $240^{th}$ columns is determined by the display contents of the pixels of the $(n-1)^{th}$ row and the $n^{th}$ row. Accordingly, the shift voltage ΔV of the common electrode 108 of the $i^{th}$ row when the scan signal Yi is changed from the H level to the L level depends on the display contents of the previous row as well as the $i^{th}$ row.

Although the voltage Ci of the common electrode 108 of the $i^{th}$ row is described herein, the same is true in the adjacent $(i+1)^{th}$ row, that is, the same is true in the first to $320^{th}$ rows.

In the present embodiment, the TFT 172 is turned on in a period when the scan signals Yi in the odd-numbered rows become of the H level and thus the common electrode 108 of the $i^{th}$ row is connected to the first detection line 181. Accordingly, since the first common signal output circuit 31 outputs the first common signal Vc1 to the first power supply line 161 such that the voltage of the common electrode 108 detected via the first detection line 181 becomes the voltage of the first reference signal Vc1ref, the common electrode 108 of the $i^{th}$ row in the period when the scan signal Yi becomes of the H level is held at the voltage Vsl if the positive polarity writing is specified and is held at the voltage Vsh if the negative polarity writing is specified, although it is influenced by noise.

Similarly, in a period when the scan signals Y(i+1) in the even-numbered rows become of the H level, the common electrode 108 of the $(i+1)^{th}$ row is connected to the second detection line 182. Accordingly, since the second common signal output circuit 32 outputs the second common signal Vc2 to the second power supply line 162 such that the voltage of the common electrode 108 detected via the second detection line 182 becomes the voltage of the second reference signal Vc2ref, the common electrode 108 of the $(i+1)^{th}$ row in the period when the scan signal Y(i+1) becomes of the H level is held at the voltage Vsh if the negative polarity writing is specified and is held at the voltage Vsl if the positive polarity writing is specified, although it is influenced by noise.

Although the odd-numbered $i^{th}$ row and the next even-numbered $(i+1)^{th}$ row are representatively described herein, the same is true in all the common electrodes 109 of the first to $320^{th}$ rows. Accordingly, in the present embodiment, it is possible to suppress the occurrence of the horizontal display unevenness for each row.

If the ON resistance of the TFT 171 is small, the noise which occurs in the common electrode 108 can be reduced. In this case, the transistor size of the TFT 171 needs to increase. If the transistor size of the TFT 171 increases, a so-called frame region located at the outside of the display region 100 requires a margin corresponding to the TFT 171 in the configuration in which the TFT is provided on the device substrate. However, since the frame region does not contribute to the display, the frame region becomes a dead space in view of the display device and the number of pieces taken from one mother board is reduced and cost is increased.

In contrast, in the present embodiment, when the scanning line of any row is selected, the TFT 172 of this row is turned on and the common electrode of this row is detected. Since the first common signal Vc1 (or the second common signal Vc2) in which the detected voltage of the common electrode 108 becomes the voltage of the first reference signal Vc1ref (or the second reference signal Vc2ref) is supplied to the common electrode 108, the ON resistance of the TFT 171 may be large.

In the $i^{th}$ row, since a timing when the horizontal scan period H of the scanning line of the $i^{th}$ row starts, that is, a timing when the scan signal Yi is changed from the L level to the H level, is a timing for varying the voltage of the data signals X1 to X240, noise is relatively large. Accordingly, in the first common signal output circuit 31, if the configuration for performing the feedback control from a start timing to a completion timing of the horizontal scan period H is employed, the power consumption of the operational amplifier 300 may increase in order to cancel noise or the circuit scale or the self power consumption of the operational amplifier 300 may increase in order to prevent malfunction such as oscillation.

Here, it is important whether the common electrode 108 of the $i^{th}$ row approaches the voltage Vsl or the voltage Vsh immediately after the scan signal Yi is changed from the H level to the L level, and the voltage immediately after the scan signal Yi is changed from the L level to the H level is not important. That is, although noise occurs, it is sufficient that the voltage is reduced to a target voltage Vsl or the voltage Vsh until the horizontal scan period H is finished.

With respect to the first common signal output circuit 31 of the present embodiment, the switches 311 and 312 are turned on and off in the first half period of the horizontal scan period H and the switches 311 and 312 are turned off and on in the second half period of the horizontal scan period H.

Accordingly, the first common signal output circuit 31 outputs the first common signal Vc1 obtained by buffering the first reference signal Vc1ref in the first half period of the horizontal scan period H and outputs the first common signal Vc1 obtained by performing the feedback control such that the voltage of the first detection line 181 becomes the voltage of the first reference signal Vc1ref, in the second half period of the horizontal scan period H.

According to such a configuration, since the configuration for allowing the occurrence of the noise in the first half period of the horizontal scan period H and suppressing the influence of the noise in the second half period of the horizontal scan period is employed, the occurrence of the horizontal display unevenness can be suppressed, the circuit sizes of the first common signal output circuit 31 and the second common signal output circuit 32 can be prevented from being increased, and the low power consumption of these circuits can be realized.

In this configuration, the first common signal output circuit 31 needs to stabilize the first common signal Vc1 in a period for selecting the scanning lines in the odd-numbered rows and the second common signal output circuit 31 needs to stabilize the second common signal Vc2 in a period for selecting the scanning lines in the even-numbered rows. These periods are alternated for each horizontal scan period H. Accordingly, the first common signal output circuit 31 is in an idle state in a period for selecting the scanning lines of the unrelated even-numbered rows and the second common signal output circuit 32 is in an idle state in a period for selecting the scanning lines of the unrelated odd-numbered rows.

If the electro-optical device is, for example, small-sized, since a variation in voltage of the common electrode due to noise is small, the feedback control may be performed from the start of the horizontal scan period H in the first common signal output circuit 31 and the second common signal output circuit 32. In this configuration, since the period specifying signal Ha is unnecessary and the switches 311 and 312 and the NOT circuit 315 are unnecessary, the circuit configuration can be simplified.

Second Embodiment

Next, a second embodiment of the invention will be described.

In the first embodiment, the first common signal output circuit 31 is provided in correspondence with the odd-numbered row and the second common signal output circuit 31 is provided in correspondence with the even-numbered row, but any one of the circuits needs to be operated when one row of scanning line is selected.

Accordingly, in the second embodiment, the first common signal Vc1 and the second common signal Vc2 is switched by one common signal output circuit.

Figure 7:
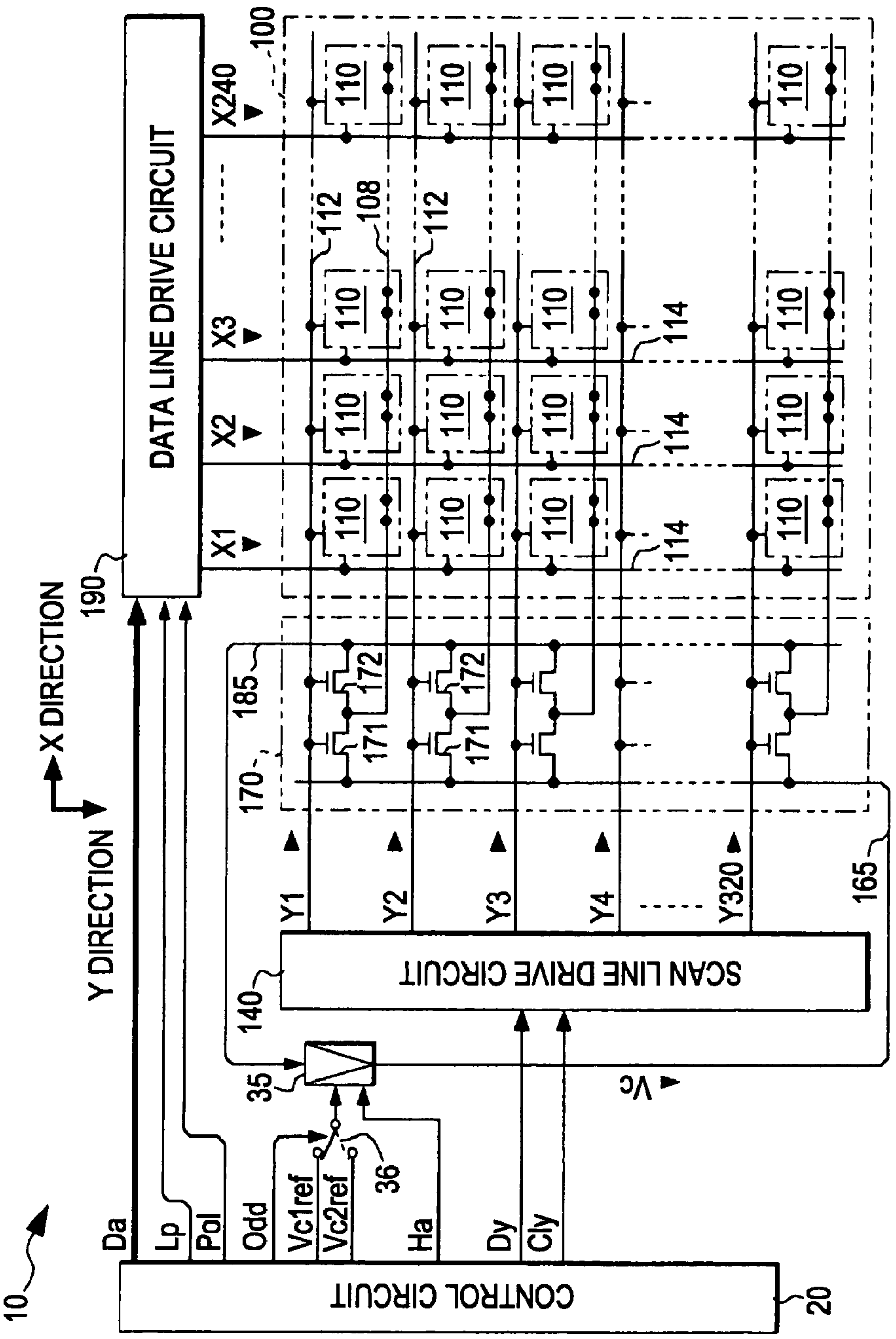
FIG. 7 is a view showing the configuration of an electro-optical device according to a second embodiment of the invention.

FIG. 7 is a view showing the configuration of an electro-optical device 10 according to the second embodiment.

In the drawing, a common signal output circuit 35 is equal to the first common signal output circuit 31 (second common signal output circuit 32) of the first embodiment in the configuration, but only any one of the first reference signal Vc1ref and the second reference signal Vc2ref is supplied by the switch circuit 36.

Figure 9:
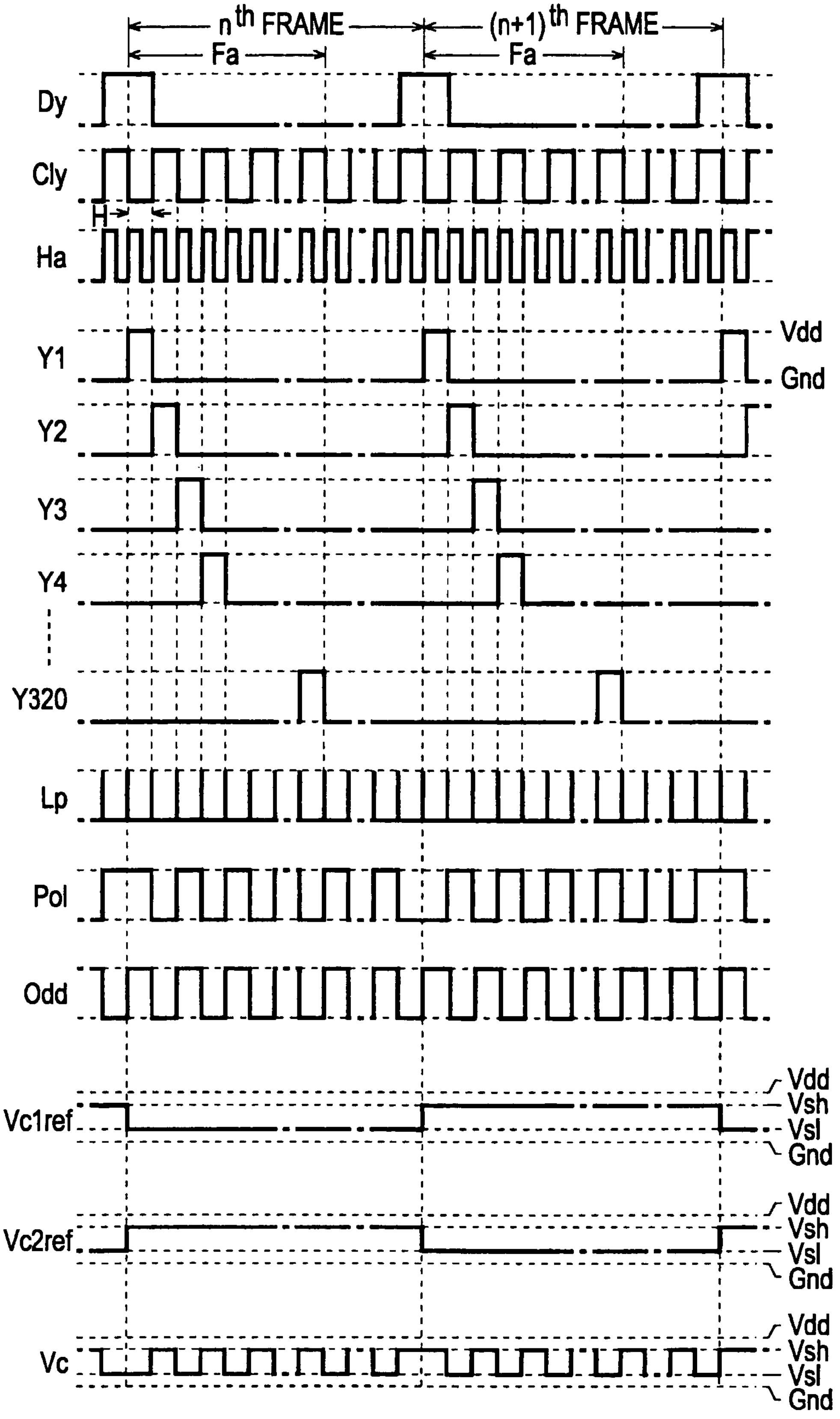
FIG. 9 is a view explaining the operation of the electro-optical device.

In the second embodiment, if the polarity specifying signal Pol is the H level, the positive polarity writing is specified to the scanning line of the selected row and, if the polarity specifying signal Pol is the L level, the negative polarity writing is specified to the scanning line of the selected row. As shown in FIG. 9, in the $n^{th}$ frame period, the polarity specifying signal Pol becomes of the H level in the horizontal scan period H when the scan signal Y1 becomes of the H level and then is logically inverted in every horizontal scan period H, and, in the $(n+1)^{th}$ frame period, the polarity specifying signal Pol becomes of the L level in the horizontal scan period H when the scan signal Y1 becomes of the L level and then is logically inverted in every horizontal scan period H. Even in the present embodiment, similar to the first embodiment, since the scanning line 112 is selected in the order of first, second, third, . . . , and $320^{th}$ row, the writing polarity is inverted in every line.

The odd-numbered-row signal Odd becomes of the H level when the scan signals of the scanning lines 112 in the odd-numbered rows become of the H level and becomes of the L level when the scan signals of the scanning lines 112 in the even-numbered rows become of the H level.

A switch circuit 36 is located at a position denoted by a solid line in the drawing to output the first reference signal Vc1ref to a positive input port (+) of an operational amplifier 300 of the common signal output circuit 35 when the odd-numbered-row signal Odd becomes of the H level and is located at a position denoted by a dotted line in the drawing to output the second reference signal Vc2ref to the positive input port (+) of the operational amplifier 300 of the common signal output circuit 35 when the odd-numbered-row signal Odd becomes of the L level.

The first reference signal Vc1ref and the second reference signal Vc2ref are similar to those of the first embodiment, as shown in FIG. 9.

The common signal output circuit 35 outputs a common signal Vc obtained by buffering any one of the first reference signal Vc1ref and the second reference signal Vc2ref to a power supply line 165 when the period specifying signal Ha is the H level and outputs a common signal Vc obtained by controlling the voltage of a detection line 185 to be equal to any one of the first reference signal Vc1ref and the second reference signal Vc2ref to the power supply line 165 when the period specifying signal Ha is the L level.

In the common electrode drive circuit 170, the source electrode of the TFT 171 of each row is connected to the power supply line 165 and the drain electrode of the TFT 172 is connected to a detection line 185, regardless of the odd-numbered row and the even-numbered row.

According to the second embodiment, as shown in FIG. 9, the common signal Vc output from the common signal output circuit 35 becomes the first reference signal Vc1ref in a period when the scanning line of the odd-numbered row is selected and becomes the second reference signal Vc2ref in a period when the scanning line of the even-numbered row is selected, similar to the first embodiment, the common electrode 108 is set to the voltage Vsl or Vsh and the voltage according to the gray scale level is written to the parallel capacitor including the pixel capacitor 120 and the storage capacitor 130. Accordingly, even in the second embodiment, it is possible to suppress the occurrence of horizontal display unevenness.

Figure 8:
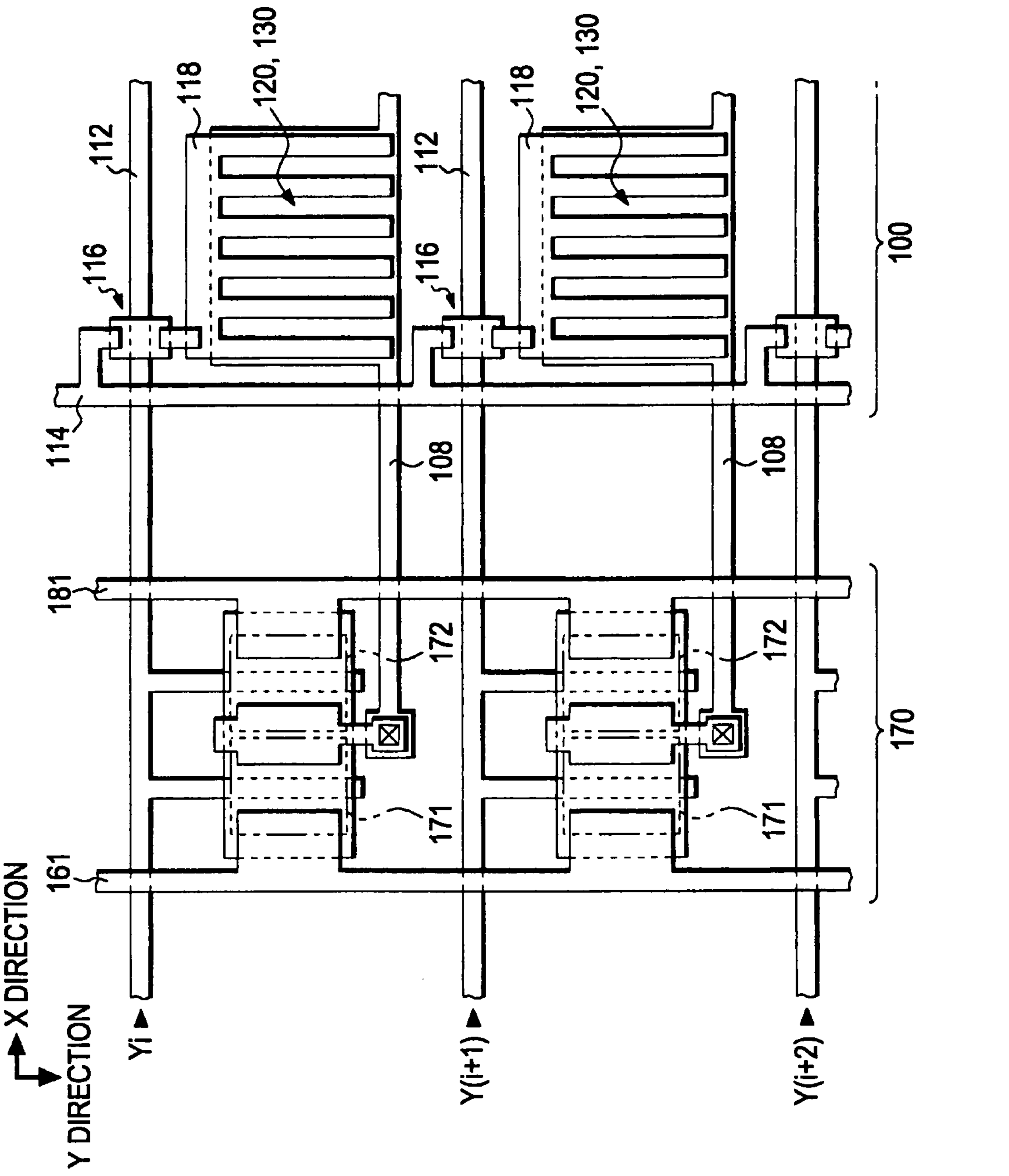
FIG. 8 is a plan view showing the configuration of main portions on a device substrate of the electro-optical device.

FIG. 8 is a plan view showing the vicinity of the boundary between a display region 100 and a common electrode drive circuit 170 on the device substrate in the second embodiment. In the second embodiment shown in FIG. 8, as can be seen from the comparison with the first embodiment shown in FIG. 3, the power supply line and the detection line are omitted one by one and the interconnections 171*a* and 172*a* of the even-numbered row are omitted. Accordingly, in the second embodiment, since an interconnection or a contact hole may not be formed, the configuration can be more simplified and the reliability can be more improved compared with the first embodiment and the area required for the common electrode drive circuit 170 can be reduced.

Third Embodiment

Figure 10:
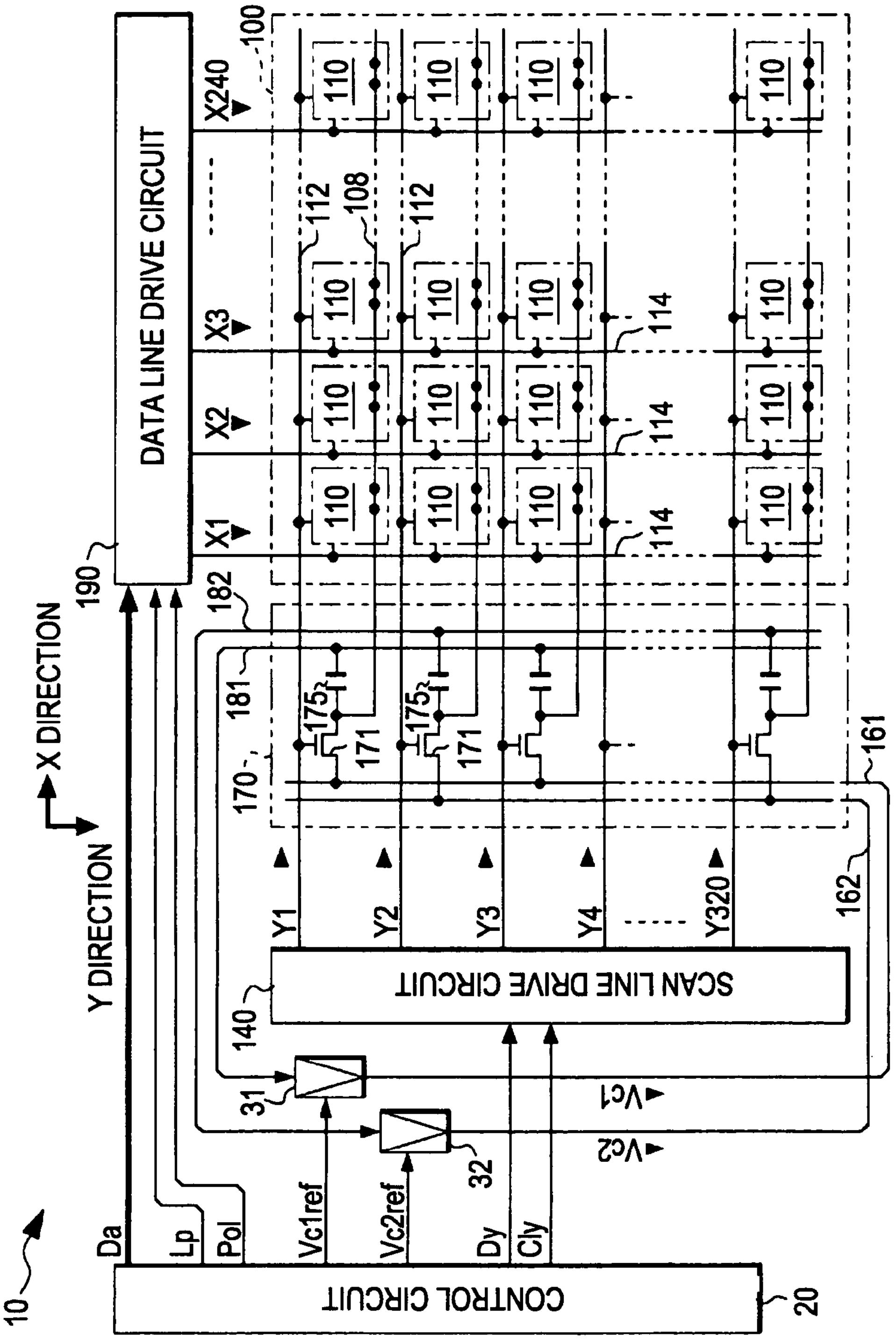
FIG. 10 is a view showing the configuration of an electro-optical device according to a third embodiment of the invention.

Next, a third embodiment of the invention will be described. FIG. 10 is a block diagram showing the configuration of an electro-optical device according to the third embodiment of the invention.

The configuration shown in FIG. 10 is different from the first embodiment (see FIG. 1) in that an auxiliary capacitor 175 is provided in each row of the common electrode drive circuit 170 instead of the TFT 172.

In more detail, one end of the auxiliary capacitor 175 corresponding to the odd-numbered row is connected to the common electrode 108 (the drain electrode of the TFT 171) of the row and the other end thereof is connected to a first detection line 181, and one end of the auxiliary capacitor 175 corresponding to the even-numbered row is connected to the common electrode 108 of the row and the other end thereof is connected to a second detection line 182.

Figure 11:
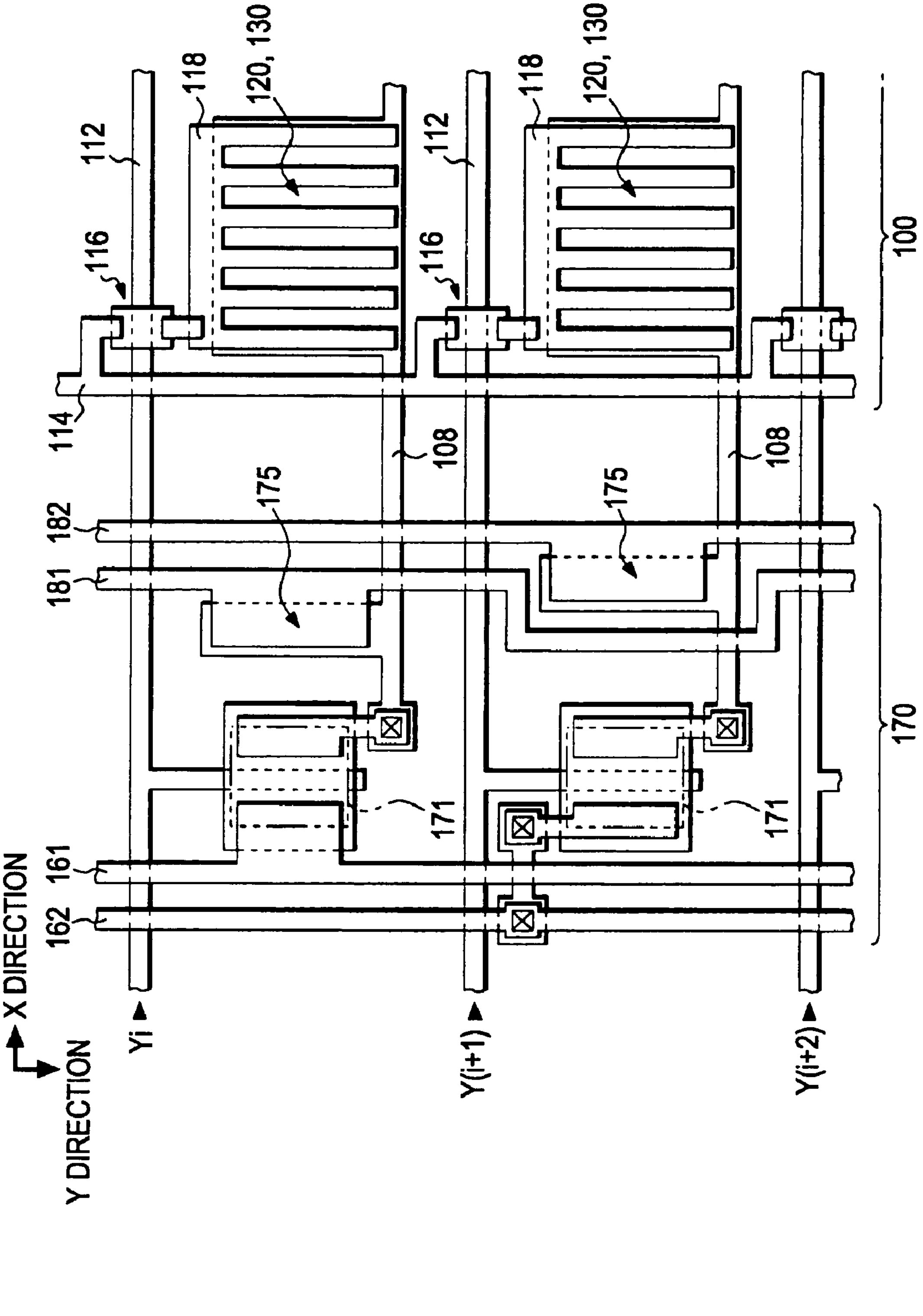
FIG. 11 is a plan view showing the configuration of main portions on a device substrate of the electro-optical device.

FIG. 11 is a plan view showing the vicinity of the boundary between a display region 100 and a common electrode drive circuit 170 on the device substrate in the third embodiment.

As shown in the figure, the auxiliary capacitor 175 of the odd-numbered $i^{th}$ row is configured by overlapping a width increasing portion of the first detection 181 with a width increasing portion of the common electrode 108 of the $i^{th}$ row with an insulating layer interposed therebetween. Similarly, the auxiliary capacitor 175 of the even-numbered $i^{th}$ row is configured by overlapping a width increasing portion of the second detection 182 with a width increasing portion of the common electrode 108 of the $(i+1)^{th}$ row with an insulating layer interposed therebetween.

According to the third embodiment, in a horizontal scan period H when the scanning line 112 of the odd-numbered row is selected, when noise occurs in the common electrode 108 of the selected odd-numbered row, the noise propagates to the first detection line 181 via the auxiliary capacitor 175 of the selected odd-numbered row. In the present embodiment, when a first common signal output circuit 31 adds the inverted signal of the propagated noise to a first reference signal Vc1ref and outputs the added signal as a first common signal Vc1, the noise which occurs in the common electrode 108 of the selected odd-numbered row is canceled.

In contrast, in a horizontal scan period H when the scanning line 112 of the even-numbered row is selected, when noise occurs in the common electrode 108 of the selected even-numbered row, the noise propagates to the second detection line 182 via the auxiliary capacitor 175 of the selected even-numbered row. In the present embodiment, when a second common signal output circuit 32 adds the inverted signal of the propagated noise to a second reference signal Vc2ref and outputs the added signal as a second common signal Vc2, the noise which occurs in the common electrode 108 of the selected even-numbered row is canceled.

Accordingly, even in the third embodiment, since the influence due to the noise generated at the common electrode 108 corresponding to the selected scanning line is reduced, it is possible to suppress the occurrence of horizontal display unevenness.

Although the scanning line 112 is selected in the order of first, second, third, . . . , and $320^{th}$ row in the scanning line drive circuit 140, the scanning line may be selected in the order of $320^{th}$, $319^{th}$, $318^{th}$, . . . , and first row. Since specifying the writing polarity in a vertical return time is meaningless, the logic signal of the period specifying signal Ha may be fixed to a predetermined level.

Although a pixel capacitor 120 is in a normally white mode in the embodiment, a normally black mode which becomes a dark state when a voltage is not applied may be applied. Three pixels of red (R), green (G) and blue (B) may configure one dot to perform color display. Four colors of pixels including another color (for example, cyan (C)) may configure one dot to improve color reproducibility.

Electronic Apparatus

Next, an example of an electronic apparatus having the electro-optical device 10 according to the above-described embodiments as a display device will be described.

Figure 12:
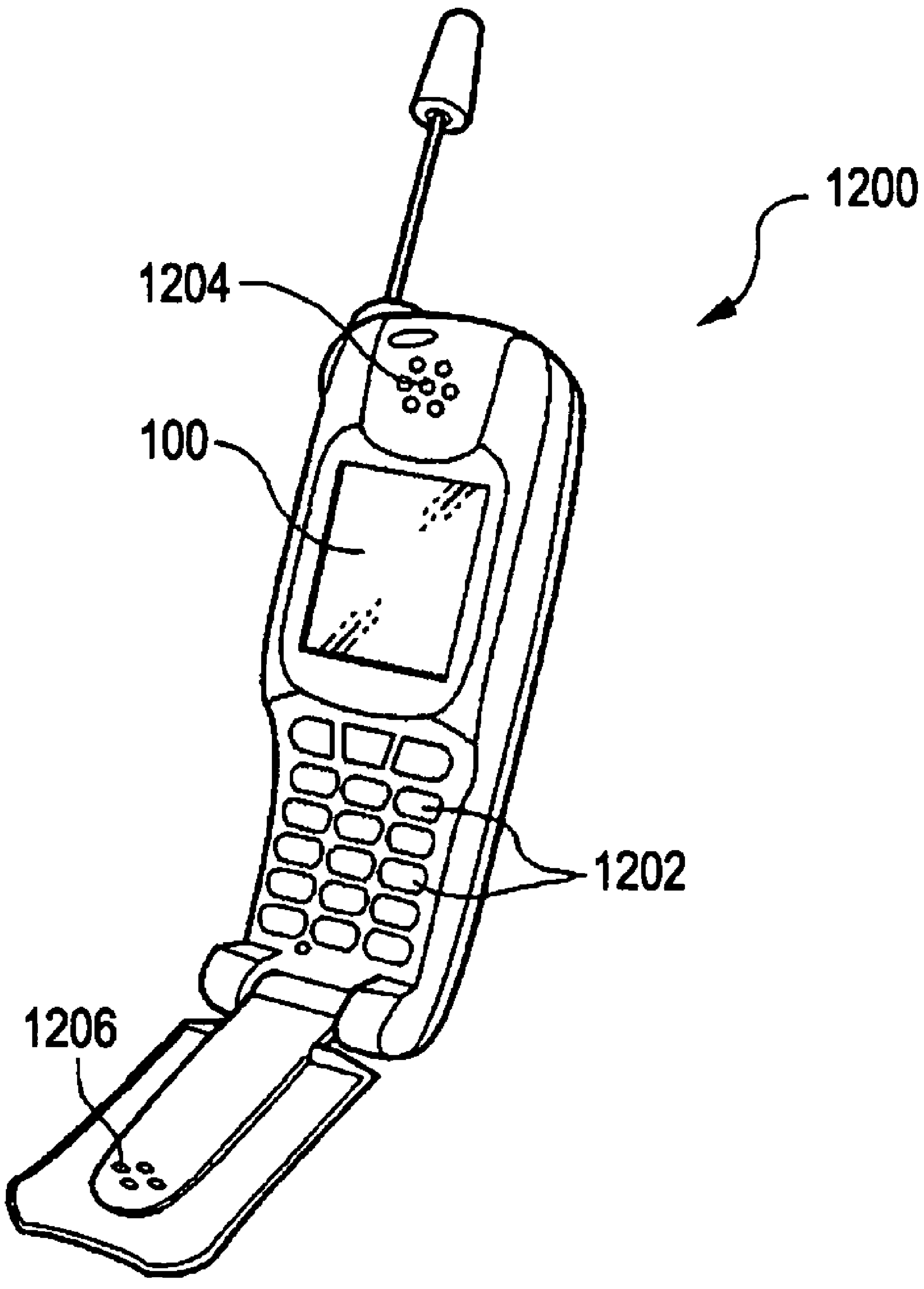
FIG. 12 is a view showing a mobile telephone using the electro-optical device according to the embodiment of the invention.

FIG. 12 is a view showing the configuration of a mobile telephone 1200 using the electro-optical device according to the embodiment of the invention. As shown, the mobile telephone 1200 includes a plurality of operation buttons 1202, an ear piece 1204, a mouth piece 1206, and the above-described electro-optical device 10.

As an electronic apparatus using the electro-optical device 10, in addition to the mobile telephone shown in FIG. 12, there are a digital still camera, a mobile personal computer, a liquid crystal television set, a video recorder, a car navigation system, a pager, an electronic organizer, an electronic calculator, a word processor, a workstation, a videophone, a POS terminal, a touch-panel-equipped device. The above-described electro-optical device 10 is applicable as a display unit of such exemplary electronic devices.

The entire disclosure of Japanese Patent Application No. 2006-283467, filed Oct. 18, 2006 is expressly incorporated by reference herein.

What is claimed is:

1. A drive circuit of an electro-optical device including:
plural rows of scanning lines;
plural columns of data lines;
a plurality of common electrodes provided in correspondence with the plural rows of scanning lines;
pixel switching elements provided in correspondence with intersections of the plural rows of scanning lines and the plural columns of data lines, each of which has one end connected to the data line corresponding thereto and is put into a conductive state when a scanning line corresponding thereto is selected;
pixel capacitors, each of which has one end connected to the other end of the pixel switching element corresponding thereto and the other end of which is connected to the common electrode corresponding thereto; and
pixels each having a gray scale level according to a hold voltage of the pixel capacitor corresponding thereto,
the drive circuit comprises:
a scanning line drive circuit for sequentially selecting one of the scanning lines in a predetermined order;
a plurality of common electrode drive circuits for connecting the common electrodes to a power supply line, to which a predetermined voltage is applied, when the scanning line corresponding to the common electrode is selected, each common electrode drive circuit including a first transistor and a second transistor connected to each of the plurality of common electrodes;
a common signal output circuit for supplying a common signal having a voltage for allowing a detection voltage of the common electrode corresponding to a scanning line to become a reference voltage when the scanning line is selected; and
a data line drive circuit for supplying a data signal having a voltage according to the gray scale level of the pixel to the pixel corresponding to the selected scanning line via the data line,
each of the first transistors connected to each common electrode has a gate electrode connected to the scanning line corresponding to the common electrode, a source electrode connected to the power supply line, and a drain electrode connected to the common electrode,
each of the second transistors connected to each common electrode has a gate electrode connected to the scanning line corresponding to the common electrode, a source electrode connected to the common electrode, and a drain electrode connected to a detection line, and
the common signal output circuit outputs the common signal to the power supply line such that the voltage of the detection line becomes the reference voltage.

2. The drive circuit according to claim 1, wherein the common signal output circuit buffers the reference voltage in a first period when a period for selecting the scanning line starts, and outputs the common signal for performing feedback control such that the voltage of the common electrode becomes the reference voltage, in a second period when a period for selecting the scanning line is finished.

3. The drive circuit according to claim 1, wherein the common signal output circuit sets any one of a low voltage and a high voltage to a common electrode provided in a scanning line of an odd-numbered row and sets the other of the low voltage and the high voltage to a common electrode provided in a scanning line of an even-numbered row, as the reference voltage.

4. The drive circuit according to claim 3,
wherein the common signal output circuit includes:
a first common signal output circuit provided in correspondence with the odd-numbered row;
a second common signal output circuit provided in correspondence with the even-numbered row, and
wherein the first common signal output circuit detects the voltage of the common electrode provided in correspondence with the scanning line and supplies a first power supply line with a first common signal for controlling the detected voltage to become any one of the low voltage and the high voltage when the scanning line of the odd-numbered row is selected, wherein the second common signal output circuit detects the voltage of the common electrode provided in correspondence with the scanning line and supplies a second power supply line with a second common signal for controlling the detected voltage to become the other of the low voltage and the high voltage when the scanning line of the even-numbered row is selected, and wherein the common electrode drive circuit connects the common electrode corresponding to the selected scanning line of the odd-numbered row to the first power supply line if the selected scanning line is that of the odd-numbered row and connects the common electrode corresponding to the selected scanning line of the even-numbered row to the second power supply line when the selected scanning line is that of the even-numbered row.

5. The drive circuit according to claim 3, wherein the common signal output circuit has a switch circuit for selecting any one of the low voltage and the high voltage, wherein the switch circuit selects any one of the low voltage and the high voltage when the scanning line of the odd-numbered row is selected, selects the other of the low voltage and the high voltage when the scanning line of the even-numbered row is selected, and supplies the selected voltage as the reference voltage of the common signal output circuit.

6. The drive circuit according to claim 1, wherein the common electrode drive circuit includes auxiliary capacitors in correspondence with the common electrodes, together with the first transistors, wherein each of the first transistors corresponding to the common electrodes has a gate electrode connected to the scanning line corresponding to the common electrode, a source electrode connected to the power supply line, and a drain electrode connected to the common electrode, wherein one end of each of the auxiliary capacitors corresponding to the common electrode is connected to the common electrode and the other end thereof is connected to a detection line, and wherein the common signal output circuit outputs the common signal to the power supply line such that the voltage of the detection line becomes the reference voltage.

7. An electro-optical device comprising:

plural rows of scanning lines;

plural columns of data lines;

a plurality of common electrodes provided in correspondence with the plural rows of scanning lines;

pixel switching elements provided in correspondence with intersections of the plural rows of scanning lines and the plural columns of data lines, each of which has one end connected to the data line corresponding thereto and is put into a conductive state when a scanning line corresponding thereto is selected;

pixel capacitors, each of which has one end connected to the other end of the pixel switching element corresponding thereto and the other end of which is connected to the common electrodes corresponding thereto;

pixels each having a gray scale level according to a hold voltage of each of the pixel capacitors;

a scanning line drive circuit for sequentially selecting one of the scanning lines in a predetermined order;

a plurality of common electrode drive circuits for connecting the common electrodes to a power supply line, to which a predetermined voltage is applied, when the scanning line corresponding to the common electrode is selected, each common electrode drive circuit including a first transistor and a second transistor connected to each of the plurality of common electrodes;

a common signal output circuit for supplying a common signal having a voltage for allowing a detection voltage of the common electrode corresponding to a scanning line to become a reference voltage when the scanning line is selected; and a data line drive circuit for supplying a data signal having a voltage according to the gray scale level of the pixel to the pixel corresponding to the selected scanning line via the data line, each of the first transistors connected to each common electrode has a gate electrode connected to the scanning line corresponding to the common electrode, a source electrode connected to the power supply line, and a drain electrode connected to the common electrode, each of the second transistors connected to each common electrode has a gate electrode connected to the scanning line corresponding to the common electrode, a source electrode connected to the common electrode, and a drain electrode connected to a detection line, and the common signal output circuit outputs the common signal to the power supply line such that the voltage of the detection line becomes the reference voltage.

8. An electronic apparatus comprising the electro-optical device according to claim 7.

9. The drive circuit of an electro-optical device according to claim 1, wherein the detection line supplies the detection voltage of the common electrode to the common signal output circuit.

* * * * *